United States Patent
Chen et al.

(10) Patent No.: US 11,320,377 B2
(45) Date of Patent: May 3, 2022

(54) DETECTION DEVICE

(71) Applicant: Wistron Corporation, New Taipei (TW)

(72) Inventors: Yu-Lin Chen, New Taipei (TW); Yi Fan Hsieh, New Taipei (TW)

(73) Assignee: Wistron Corporation, New Taipei (TW)

( * ) Notice: Subject to any disclaimer, the term of this patent is extended or adjusted under 35 U.S.C. 154(b) by 217 days.

(21) Appl. No.: 16/835,329

(22) Filed: Mar. 31, 2020

(65) Prior Publication Data

US 2021/0223175 A1 Jul. 22, 2021

(30) Foreign Application Priority Data

Jan. 22, 2020 (TW) ................................ 109102563

(51) Int. Cl.
*G01N 21/64* (2006.01)
*G02B 27/10* (2006.01)

(52) U.S. Cl.
CPC ....... *G01N 21/645* (2013.01); *G02B 27/1006* (2013.01); *G02B 27/1086* (2013.01); *G01N 2021/6465* (2013.01)

(58) Field of Classification Search
CPC ......... G01N 21/645; G01N 2021/6465; G02B 27/1006; G02B 27/1086
See application file for complete search history.

(56) References Cited

U.S. PATENT DOCUMENTS

| 10,317,281 | B2 * | 6/2019 | Wang | G01J 3/021 |
| 2006/0227320 | A1 * | 10/2006 | Tamiya | G01J 3/10 |
| | | | | 356/300 |
| 2018/0120221 | A1 * | 5/2018 | Mohan | G01N 21/645 |

FOREIGN PATENT DOCUMENTS

CN 109974852 A * 7/2019 ............ G01J 3/1804

OTHER PUBLICATIONS

"Office Action of Taiwan Counterpart Application", dated Dec. 7, 2020, p. 1-p. 9.

* cited by examiner

*Primary Examiner* — David P Porta
*Assistant Examiner* — Jeremy S Valentiner
(74) *Attorney, Agent, or Firm* — JCIPRNET

(57) ABSTRACT

A detection device includes a light emitting element, an accommodation frame, a light detector, and a movable light splitter. The light emitting element provides an excitation beam. The accommodation frame accommodates an object under test, and a portion of the excitation beam whose dominant light emitting wavelength falls within a first waveband range forms a fluorescent beam after passing through the object under test. The light detector receives a portion of the fluorescent beam whose dominant light emitting wavelength falls within a second waveband range. The movable light splitter forms a plurality of sub-beams from an incident beam. The sub-beams have respectively different dominant light emitting wavelengths and exits at different emitting angles. The incident beam is at least one of the excitation beam and the fluorescent beam.

13 Claims, 11 Drawing Sheets

DETECTION DEVICE

CROSS-REFERENCE TO RELATED APPLICATION

This application claims the priority benefit of Taiwan application serial no. 109102563, filed on Jan. 22, 2020. The entirety of the above-mentioned patent application is hereby incorporated by reference herein and made a part of this specification.

BACKGROUND

Technical Field

The disclosure relates to a detection device, and particularly relates to a detection device based on photoluminescence.

Description of Related Art

According to the conventional detection technology using real-time quantitative PCR (also known as real-time PCR or qPCR), a fluorescent beam is formed after an excitation beam whose dominant light emitting wavelength falls within a specific waveband range passes through an object under test, then a light detector is configured to receive the fluorescent beam whose dominant light emitting wavelength falls within another waveband range, and then the properties of the fluorescent beam falling within the waveband range is detected.

In general, there are many fluorescent reagents for addition in an object under test available on the market, and each fluorescent reagent has a relatively suitable excitation spectrum, so a suitable band pass filter needs to be disposed on the light path before the excitation beam passes through the object under test according to the type of the fluorescent reagent to effectively form a required fluorescent beam. In addition, since the signal of the fluorescent beam is, in general, relatively weak and may be easily covered by the signals of stray light, it is common to also dispose a light filter module having several band pass filters on the light path before the light detector receives the fluorescent beam within a specific waveband range, so as to filter out the signals of stray light outside the specific waveband range and purify the properties of the fluorescent beam. To ensure detection accuracy, the OD value of each band pass filter must be as high as the level of OD6. In other words, the order of magnitude of the passing rate for the cutoff waveband of each band pass filter needs to be as little as equal to or less than ten to the negative sixth power.

Meanwhile, when the detection device needs to detect an object under test used with various fluorescent reagents, the detection device needs to be provided with a plurality of fluorescent paths (i.e., the entire light paths before and after the excitation beam forms the fluorescent beam) to cope with the needs of different fluorescent reagents. In addition, different light filter modules having different bandpass filters need to be disposed on the respective fluorescent paths, so as to meet the needs for forming excitation beams having suitable excitation spectra and purifying the properties of the fluorescent beams.

Consequently, when the number of fluorescent channels increases, the number of OD6-compatible bandpass filters needs to increase as well, which increases the production cost. Moreover, when the detection device is provided with multiple fluorescent paths, as the light path system arranged accordingly becomes much more complicated, it becomes more difficult to reduce the device space as well as assembling complexity. Besides, when the fluorescent reagent in the object under test needs to be replaced or added, the light source of the excitation beam on the fluorescent path and all the band pass filters need to be correspondingly replaced or added. Therefore, updating and expansion of equipment becomes difficult.

SUMMARY OF THE DISCLOSURE

The disclosure provides a detection device with favorable detection accuracy and low cost.

A detection device according to an embodiment of the disclosure includes a light emitting element, an accommodation frame, a light detector, and a movable light splitter. The light emitting element is configured to provide an excitation beam. The accommodation frame has at least one sleeve structure. The at least one sleeve structure is configured to accommodate an object under test, and a portion of the excitation beam whose dominant light emitting wavelength falls within a first waveband range forms a fluorescent beam after passing through the object under test. The light detector is configured to receive a portion of the fluorescent beam whose dominant light emitting wavelength falls within a second waveband range. The movable light splitter includes a first movable light splitter and/or a second movable light splitter. Each of the first movable light splitter and the second movable light splitter has a first surface and a plurality of inclined surfaces. The inclined surfaces are inclined with respect to the first surface, and the first surface is able to be rotated a predetermined light splitting angle with respect to an incident beam. The incident beam is at least one of the excitation beam and the fluorescent beam, when the incident beam is the excitation beam, a value of the first waveband range corresponds to a value of the light splitting angle, and when the incident beam is the fluorescent beam, a value of the second waveband range corresponds to the value of the light splitting angle.

According to an embodiment of the disclosure, the incident beam forms a plurality of sub-beams after passing through the inclined surface, and the sub-beams have respectively different dominant light emitting wavelengths and exit at different emitting angles.

According to an embodiment of the disclosure, when the incident beam is the excitation beam, the movable light splitter includes the first movable light splitter. The first movable light splitter is located on a transmission path of the excitation beam and between the light emitting element and the accommodation frame. The at least one sleeve structure is located on transmission paths of the sub-beams, and each of the at least one sleeve structure has a slit configured to receive a portion of the sub-beams whose dominant light emitting wavelengths fall within the first waveband range.

According to an embodiment of the disclosure, a first included angle is present between the incident beam and a normal direction of the first surface, and a second included angle is present between the portion of the sub-beams whose dominant light emitting wavelengths fall within the first waveband range and the normal direction of the first surface, and a sum of the first included angle and the second included angle is a fixed value.

According to an embodiment of the disclosure, a width of the slit ranges between 0.5 mm and 1 mm.

According to an embodiment of the disclosure, the light splitting angle is an included angle between the incident beam and a normal direction of the first surface, an angle when the incident beam and the normal direction of the first surface overlap each other is set as 0 degrees, when the first surface is rotated in a clockwise direction with respect to the incident beam, a value of the light splitting angle is positive, and when the first surface is rotated in a counterclockwise direction with respect to the incident beam, the value of the light splitting angle is negative, and the light splitting angle ranges between −2.7 degrees and 14.2 degrees.

According to an embodiment of the disclosure, when the incident beam is the fluorescent beam, the movable light splitter includes the second movable light splitter. The second movable light splitter is located on a transmission path of the fluorescent beam and between the accommodation frame and the light detector, the light detector is located on transmission paths of the sub-beams, and a sensing surface of the light detector is configured to receive a portion of the sub-beams whose dominant light emitting wavelengths fall within the second waveband range.

According to an embodiment of the disclosure, a first included angle is present between the incident beam and a normal direction of the first surface, and a second included angle is present between the portion of the sub-beams whose dominant light emitting wavelengths fall within the second waveband range and the normal direction of the first surface, and a sum of the first included angle and the second included angle is a fixed value.

According to an embodiment of the disclosure, the light splitting angle is an included angle between the incident beam and a normal direction of the first surface, an angle when the incident beam and the normal direction of the first surface overlap each other is set as 0 degrees, when the first surface is rotated in a clockwise direction with respect to the incident beam, a value of the light splitting angle is positive, and when the first surface is rotated in a counterclockwise direction with respect to the incident beam, the value of the light splitting angle is negative, and the light splitting angle ranges between 5.47 degrees and 27.73 degrees.

A detection device according to an embodiment of the disclosure includes a light emitting element, an accommodation frame, a light detector, and a movable light splitter. The light emitting element is configured to provide an excitation beam. The accommodation frame has at least one sleeve structure. The at least one sleeve structure is configured to accommodate an object under test, and a portion of the excitation beam whose dominant light emitting wavelength falls within a first waveband range forms a fluorescent beam after passing through the object under test. The light detector is configured to receive a portion of the fluorescent beam whose dominant light emitting wavelength falls within a second waveband range. The movable light splitter includes a first movable light splitter and/or a second movable light splitter. Each of the first movable light splitter and the second movable light splitter has a plurality of light splitting areas, each of the light splitting areas has a first surface and a plurality of inclined surfaces, the inclined surfaces are inclined with respect to the first surface, intervals among the inclined surfaces of the respective light splitting areas define grating constants of the respective light splitting areas, the grating constants of the respective light splitting areas are different from one another, and the first surface is able to move with respect to the incident beam, such that the light splitting area having the defined grating constant enters a transmission path of the incident beam, The incident beam is at least one of the excitation beam and the fluorescent beam, when the incident beam is the excitation beam, a value of the first waveband range corresponds to a value of the grating constant, and when the incident beam is the fluorescent beam, a value of the second waveband range corresponds to the value of the grating constant.

According to an embodiment of the disclosure, the value of the grating constant of each of the light splitting areas ranges between 644 nm and 1380 nm.

According to an embodiment of the disclosure, a first included angle is present between the incident beam and a normal direction of the first surface, the incident beam is incident to each of the light splitting areas at the same first included angle, a plurality of sub-beams are formed after the incident beam passes through the inclined surface of one of the light splitting areas, and the sub-beams have respectively different dominant light emitting wavelengths and exit at different emitting angles.

According to an embodiment of the disclosure, when the incident beam is the excitation beam, the movable light splitter includes the first movable light splitter. The first movable light splitter is located on a transmission path of the excitation beam and between the light emitting element and the accommodation frame. The at least one sleeve structure is located on transmission paths of the sub-beams, and each of the at least one sleeve structure has a slit configured to receive a portion of the sub-beams whose dominant light emitting wavelengths fall within the first waveband range.

According to an embodiment of the disclosure, a width of the slit ranges between 0.5 mm and 1 mm.

According to an embodiment of the disclosure, a second included angle is present between a portion of the sub-beams whose dominant light emitting wavelengths fall within the first waveband range and the normal direction of the first surface, and a sum of the first included angle and the second included angle is a fixed value.

According to an embodiment of the disclosure, when the incident beam is the fluorescent beam, the movable light splitter includes the second movable light splitter. The second movable light splitter is located on a transmission path of the fluorescent beam and between the the accommodation frame and the light detector, the light detector is located on transmission paths of the sub-beams, and a sensing surface of the light detector is configured to receive a portion of the sub-beams whose dominant light emitting wavelengths fall within the second waveband range.

According to an embodiment of the disclosure, a second included angle is present between a portion of the sub-beams whose dominant light emitting wavelengths fall within the second waveband range and the normal direction of the first surface, and a sum of the first included angle and the second included angle is a fixed value.

Based on the above, by arranging the movable light splitter, the detection device according to the embodiments of the disclosure is compatible with the various detections of different types of fluorescent reagents, and does not require a light filter module formed by band pass filters. Therefore, it becomes easy to update and expand the equipment. Moreover, since the excitation beams required by different object under tests (or the fluorescent beams that are formed) may share the same light path when the detections of various types of different fluorescent reagents are being carried out, the light path can be simplified, and the production/assembling complexity can be reduced. Accordingly, the production cost can be reduced, and the production quality can be facilitated.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
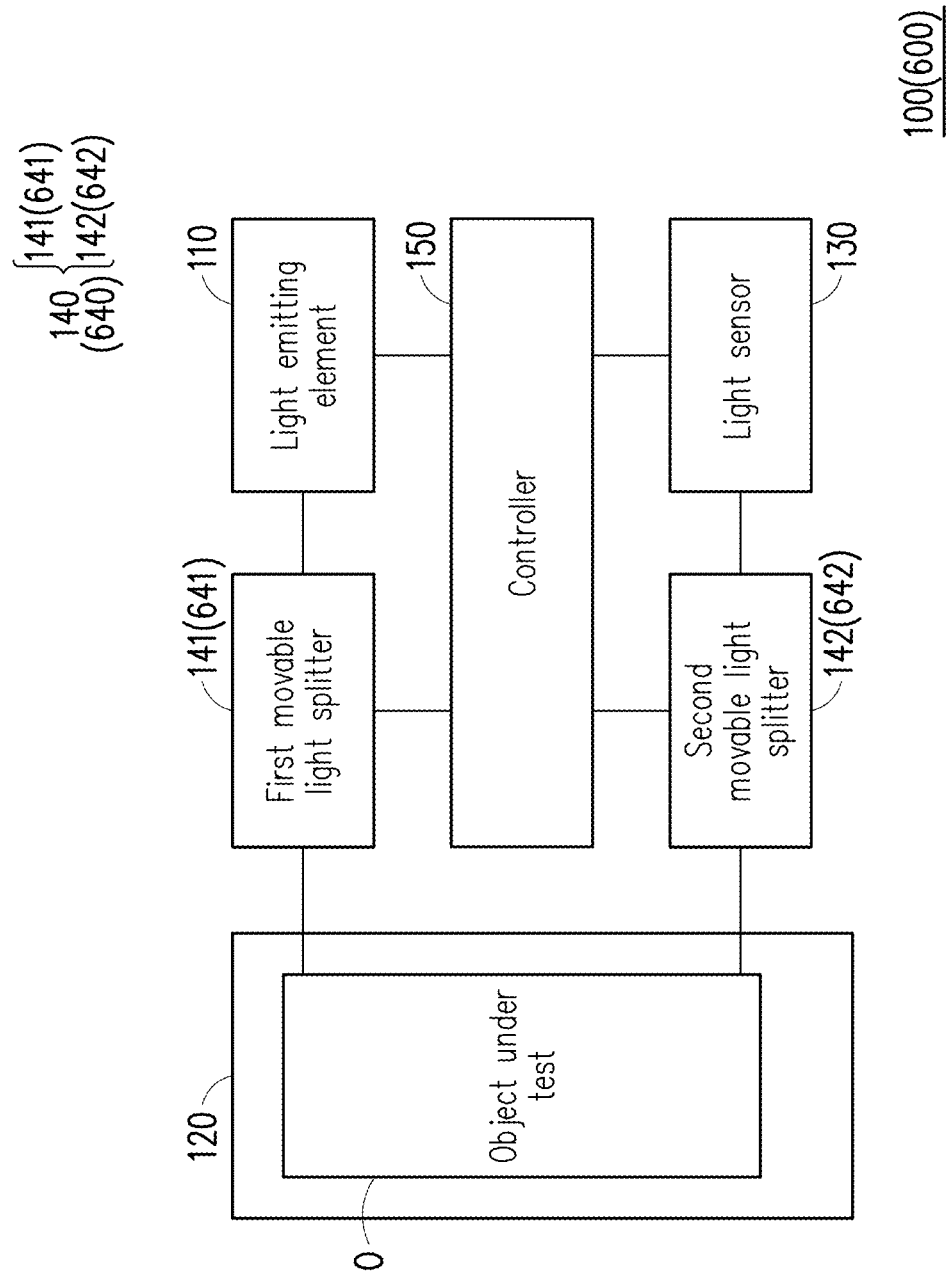
FIG. 1A is a block diagram illustrating a detection device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 1B:
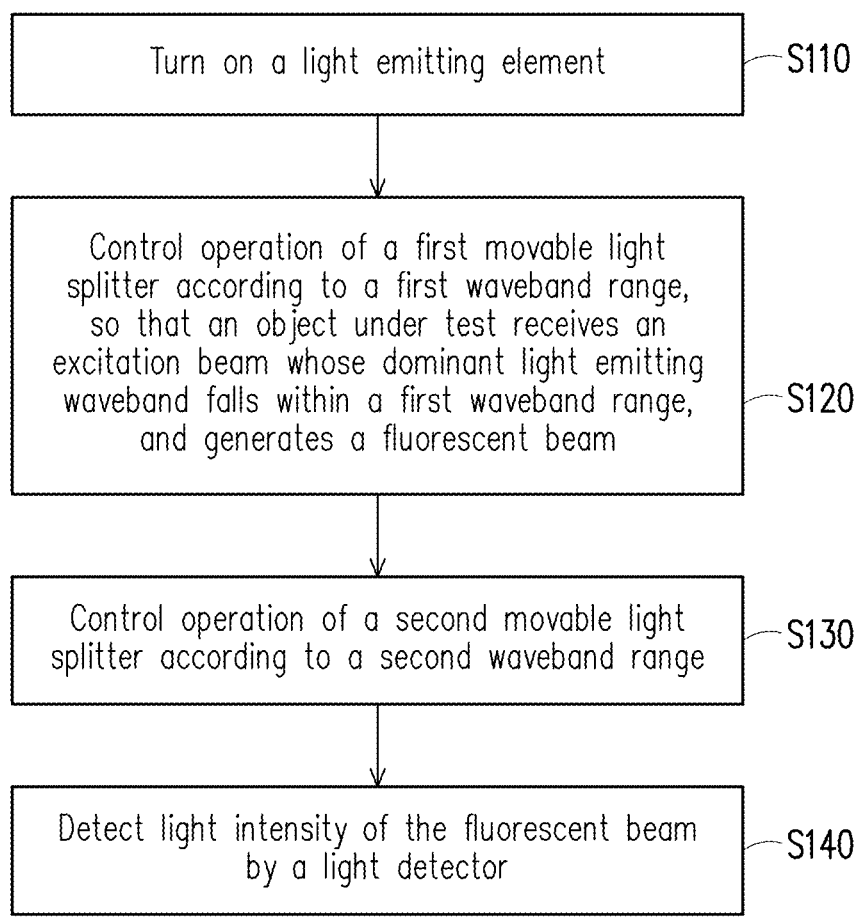
FIG. 1B is a flowchart illustrating a detection method according to an embodiment of the disclosure.
Figure 2:
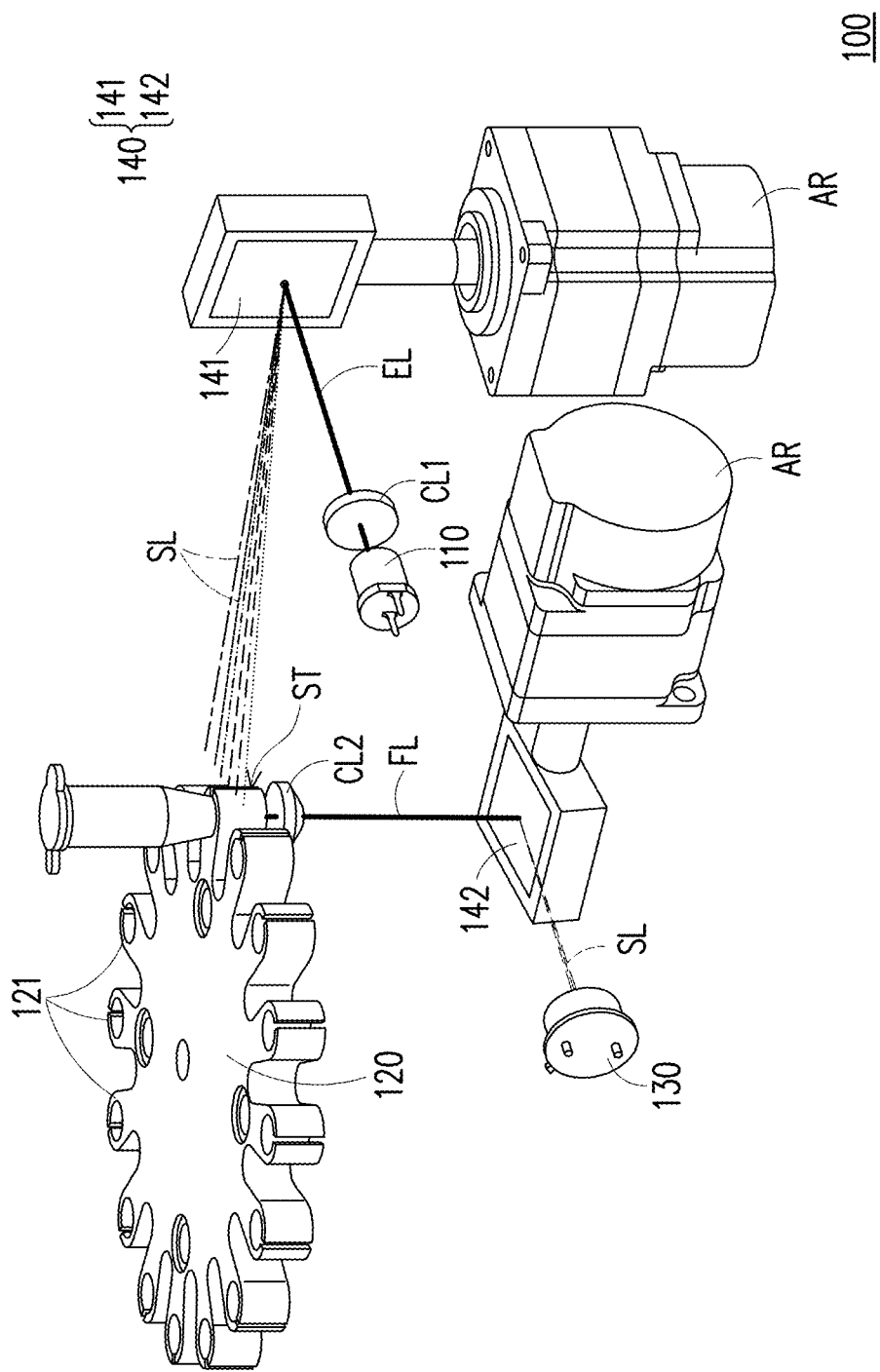
FIG. 2 is a schematic diagram illustrating a configuration of the detection device of FIG. 1A.

FIG. 1A is a block diagram illustrating a detection device according to an embodiment of the disclosure. FIG. 1B is a flowchart illustrating a detection method according to an embodiment of the disclosure. FIG. 2 is a schematic diagram illustrating a configuration of the detection device of FIG. 1A. Referring to FIGS. 1A and 2, a detection device of the embodiment includes a light emitting element 110, an accommodation frame 120, a light detector 130, and a movable light splitter 140. Specifically, in the embodiment, the light emitting element 110 is configured to provide an excitation beam EL. For example, the light emitting element 110 may be a white light emitting diode, and may be configured to provide the excitation beam EL whose light emitting wavelength falls within 400 nm to 700 nm.

The accommodation frame 120 has at least one sleeve structure 120, and the at least one sleeve structure 121 is configured to accommodate an object under test O. For example, as shown in FIG. 2, the object under test O having a fluorescent reagent is disposed in one of the at least one sleeve structure 121. It is assumed that the suitable excitation spectrum of the fluorescent reagent falls within a first waveband range. Thus, when a portion of the excitation beam EL whose dominant light emitting wavelength falls within the first waveband range passes through the object under test O, a fluorescent beam FL may be formed.

The light detector 130 is a photovoltaic sensor capable of sensing light intensity. As an example, the light detector 130 may be a photodiode. Specifically, the light detector 130 is configured to receive a portion of the fluorescent beam FL whose dominant light emitting wavelength falls within the second waveband range, which is a waveband range in which the properties of the fluorescent beam FL are more salient.

Specifically, in the embodiment, the movable light splitter 140 is configured to form a plurality of sub-beams SL from the incident beam IL. The sub-beams SL have respectively different dominant light emitting wavelengths and exit the movable light splitter 140 at different emitting angles. For example, in the embodiment, the movable light splitter 140 is a blazed grating, such as a blazed grating of a plane reflection grating type. More specifically, as shown in FIG. 2, in the embodiment, an incident beam IL is at least one of the excitation beam EL and the fluorescent beam FL. For example, in the embodiment, the movable light splitter 140 includes a first movable light splitter 141 and/or a second movable light splitter 142.

Furthermore, as shown in FIG. 2, when the incident beam IL is the excitation beam EL, the movable light splitter 140 includes the first movable light splitter 141 located on a transmission path of the excitation beam EL and between the light emitting element 110 and the accommodation frame 120. In other words, when the incident beam IL is the excitation beam EL, that is, in the case where the excitation beam EL is incident to the first movable light splitter 141, the at least one sleeve structure 121 is located on the transmission paths of the sub-beams SL of the excitation beam EL. In the embodiment, each of the at least one sleeve structure 121 has a slit ST. The slit ST is aligned with the sub-beams SL of the excitation beam EL that are incident, and may be configured to receive a portion of the sub-beams SL whose dominant light emitting wavelengths fall within the first waveband range.

Alternatively, as shown in FIG. 2, when the incident beam IL is the fluorescent beam FL, the movable light splitter 140 includes the second movable light splitter 142 located on the transmission path of the fluorescent beam FL and between the accommodation frame 120 and the light detector 130. In addition, an opening is provided at the bottom of each of the at least one sleeve structure 121, and may be configured to allow the fluorescent beam FL formed after a portion of the excitation beam whose dominant light emitting wavelength falls within the first waveband range passes through the object under test O to be emitted. In other words, when the incident beam IL is the fluorescent beam FL, that is, in the case where the fluorescent beam FL is incident to the second movable light splitter 142, the light detector 130 is located on the transmission paths of the sub-beams SL of the fluorescent beam FL.

Besides, as shown in FIG. 1A, in the embodiment, the detection device 100 further includes a controller 150. As an example, the controller 150 may be a micro-controller or a central processing unit, and include a memory, an input controller, an output controller. Specifically, in the embodiment, the controller 150 may execute a program to control the selection on the light emitting waveband range of the light emitting element 110 as well as the on and off of the light emitting element 110. In addition, the controller 150 may further control the light detector 130 to modulate the detected light intensity. For example, when the sensitivities of the light detector 130 with respect to light of different wavelengths are different, the controller 150 may offset the sensitivities. Besides, the controller 150 may further control the operation of the movable light splitter 140 to purify the wavelength of the excitation beam EL or the wavelength of the fluorescent beam FL.

More specifically, referring to FIG. 1B, in the embodiment, the detection method of FIG. 1B may be executed by using the detection device 100 in FIG. 1A and FIG. 2. In the following, the functions of the respective components of the detection device 100 according to the embodiment and how the respective components in the detection device 100 are used to perform the detection method according to the embodiment will be described in detail with reference to FIGS. 3A to 5B.

Figure 3A:
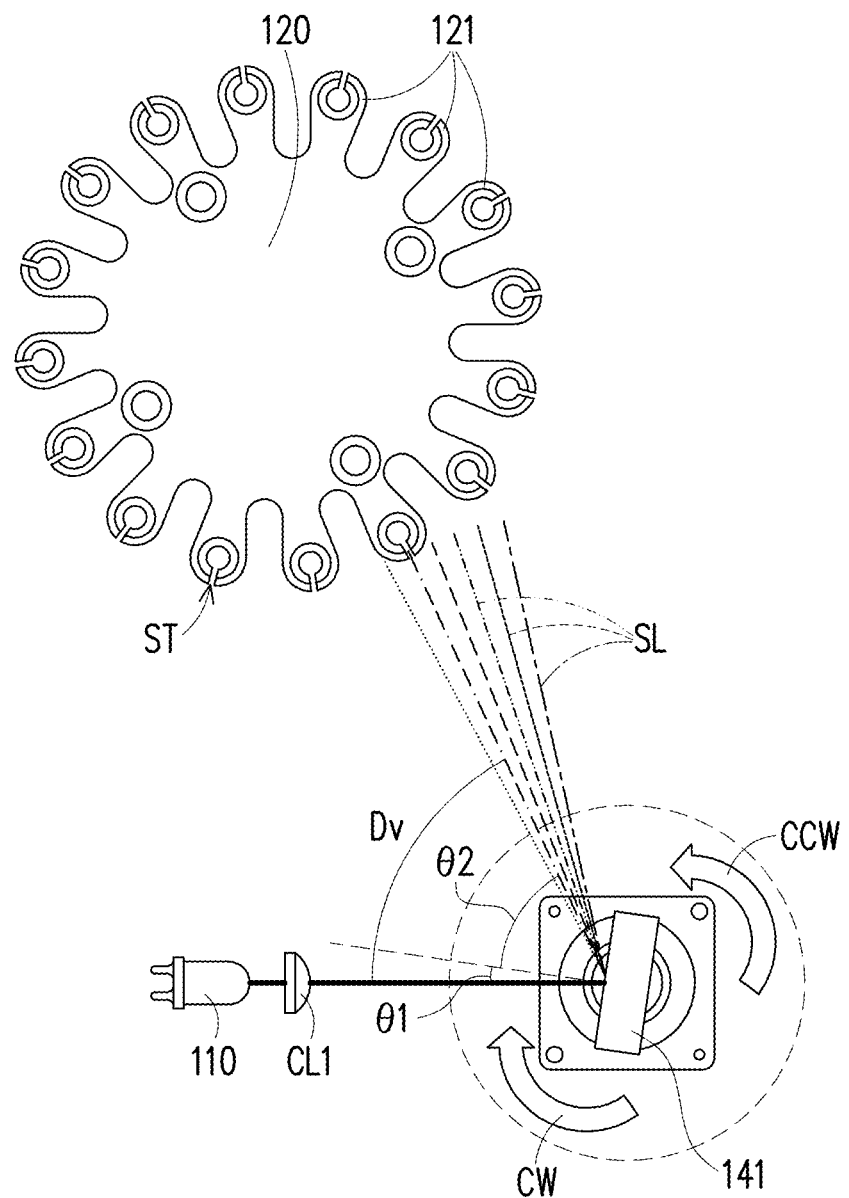
FIG. 3A is a schematic diagram illustrating a light path of the detection device of FIG. 2 when an incident beam is an excitation beam.
Figure 3B:
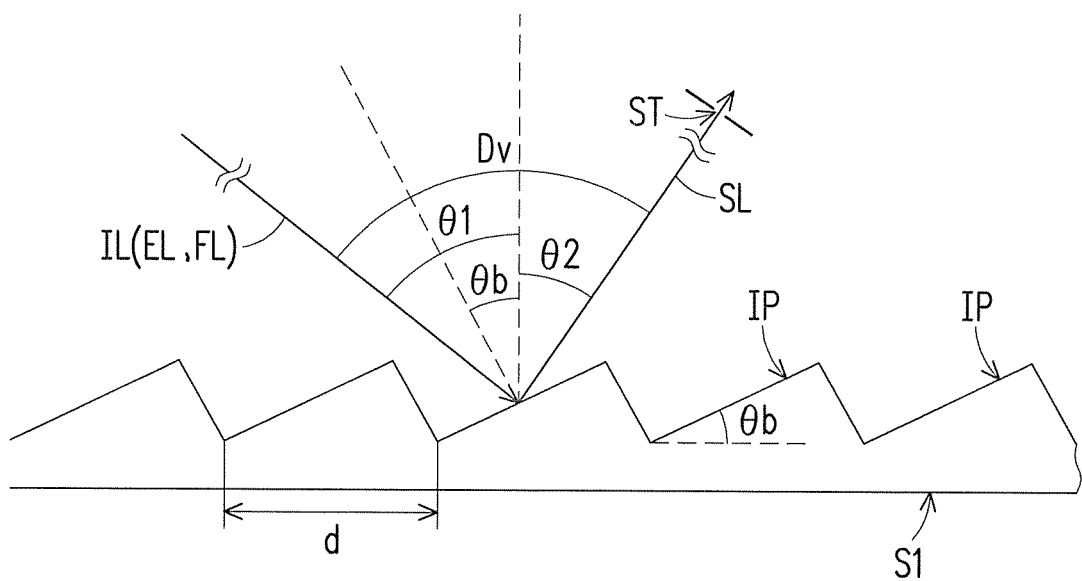
FIG. 3B is a schematic diagram illustrating a light path when the incident beam of FIG. 3A is incident to a movable light splitter.
Figure 3C:
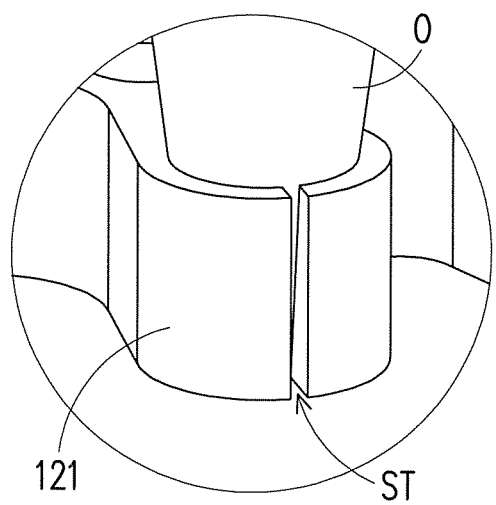
FIG. 3C is a schematic diagram illustrating a light path when a slit of FIG. 3A receives a portion of sub-beams whose dominant light emitting wavelengths fall within a first waveband range.

FIG. 3A is a schematic diagram illustrating the light path of the detection device of FIG. 2 when an incident beam is an excitation beam. FIG. 3B is a schematic diagram illustrating a light path when the incident beam of FIG. 3A is incident to a movable light splitter. FIG. 3C is a schematic diagram illustrating a light path when a slit of FIG. 3A receives a portion of sub-beams whose dominant light emitting wavelengths fall within a first waveband range. First of all, Step S110 is performed, in which the controller 150 turns on the light emitting element 110. Specifically, as shown in FIGS. 2 and 3A, at Step S110, the excitation beam EL provided by the light emitting element 110 may be collimated into a parallel beam by a collimating lens CL1.

Then, Step S120 is performed, in which the controller 150 controls the operation of the first movable light splitter 141 according to the first waveband range, so that the object under test O receives the excitation beam EL whose dominant light emitting wavelength falls within the first waveband range and generates the fluorescent beam FL. In the following, the light splitting principle and the operation of the first movable light splitter 141 will be described in detail.

Specifically, as shown in FIG. 3B, the movable light splitter 140 has a first surface S1 and a plurality of inclined surfaces IP inclined with respect to the first surface S1. For example, the movable light splitter 140 may be made of a polished metallic material or a glass substrate on which a metal film is coated, and the inclined surfaces IP may be formed by forming a series of notches of the same width and the same interval on the polished metallic material or coated glass substrate by notching.

More specifically, it is assumed that the included angle between the inclined surfaces IP and the first surface S1 is a blazed angle θb. By setting the blazed angle θb, the zero-order diffraction bright fringe of one single inclined surface IP may be mismatched from the zero-order interference position between two adjacent inclined surfaces IP, so that the interference fringe position at the second or higher order becomes a position with the maximum light emitting intensity. In this way, when the excitation beam EL formed as parallel light is illuminated on the inclined surfaces IP of the movable light splitter 140, diffraction beams, i.e., the sub-beams SL, with favorable efficiency and chromatic dispersion can be formed. The sub-beams SL have respectively different dominant light emitting wavelengths and exit the movable light splitter 140 at different emitting angles. In the sub-beams SL, the wavelength of the beam having the maximum light intensity is referred to as a blazed wavelength, and the range of the blazed wavelength may be determined by the blazed angle θb.

In the embodiment, since the waveband range of the excitation beam EL required by the fluorescent reagent included in the object under test O and the emitted fluorescent beam FL is mainly between 400 nm and 700 nm, and the light efficiency of the movable light splitter 140 is attenuated to 50% when the waveband range of the sub-beams SL is 0.67 times to 1.8 times of the blazed wavelength, the blazed wavelength is set within a waveband range between 389 nm and 597 nm, and the range of the blazed angle θb is correspondingly set between 13.49° and 21°. In this way, it is ensured that the waveband range of the sub-beams SL formed by the movable light splitter 140 can cover the waveband range of the excitation beam EL required by the object under test O and the emitted fluorescent beam FL.

Meanwhile, a grating constant d of the movable light splitter 140 may be considered based on the waveband range of the incident beam IL and the design range of the blazed angle θb (i.e., the range of the blazed wavelength). Specifically, in the embodiment, a grating interval may be calculated based on the values of the waveband range of the incident beam IL and the zero-order diffraction bright fringe (i.e., the diffraction angle), and then the grating density may be further calculated, so as to obtain the grating constant d. In the embodiment, the grating constant d is the same at respective locations of the movable light splitter 140, and the value of the grating constant d ranges between 808.3 nm and 2000 nm.

More specifically, as shown in FIGS. 2 and 3B, when the excitation beam EL is incident to the movable light splitter 140, a first included angle θ1 (i.e., the incident angle of the excitation beam EL with respect to the first surface S1) is present between the incident beam IL and a normal direction N of the first surface S1, and a second included angle θ2 (i.e., the emitting angle of the excitation beam EL required by the object under test O) is present between the portion of the sub-beams SL whose dominant light emitting wavelengths fall within the first waveband range and the normal direction N of the first surface S1. Moreover, since the location of the light emitting element 110, the incident direction, and the position of the object under test O are all fixed, no matter how the movable light splitter 140 is operated, the sum (i.e., a departure angle Dv) of the first included angle θ1 and the second included angle θ2 remains as a fixed value. Moreover, according to relevant optical theories, it can be derived that the relation between the waveband range of the diffraction beams (i.e., the sub-beams SL) and parameters such as the grating constant d, the departure angle Dv, and the first included angle θ1, etc., is represented as follows, wherein m represents the order of diffraction, and $\lambda_m$ represents the $m^{th}$ order diffraction wavelength. In the embodiment, m is set as 1.

$$\lambda_m = \frac{2d}{m}\left[\cos\left(\frac{D_v}{2}\right)\sin\left(\frac{D_v}{2} - \alpha\right)\right]$$

According to the above relation, in the embodiment, since the departure angles Dv and the grating constants d when the incident beam IL is incident to the respective locations of the movable light splitter 140 are the same, when the first included angle θ1 is changed, the object under test O receives the excitation beam EL whose dominant light emitting wavelength falls within a different waveband range. In other words, at Step S120, the movable light splitter 140 is configured to form the sub-beams SL from the incident beam IL. In addition, the movable light splitter 140 is driven by an actuator AR (e.g., motor) to rotate. When the controller 150 controls the first surface S1 to rotate to different light splitting angles with respect to the incident beam IL, the object under test O can receive the excitation beams EL whose dominant light emitting wavelengths fall within different waveband ranges.

More specifically, in the embodiment, the light splitting angle may be set as the included angle between the incident beam IL and the normal direction N of the first surface S1, and the angle when the incident beam IL and the normal direction N of the first surface S1 overlap each other is set as 0 degrees. When the first surface S1 is rotated in a clockwise direction CW with respect to the incident beam IL, the value of the light splitting angle is positive, and when the first surface S1 is rotated in a counterclockwise direction CCW with respect to the incident beam IL, the value of the light splitting angle is negative. That is, the absolute value of the light splitting angle is the size of the first included angle θ1, and the positive/negative range of the value of the light splitting angle is used to define different rotating directions. For example, in the embodiment, the range of the light splitting angle is between −2.7 degrees and 14.2 degrees. In this way, since the value of the first waveband range corresponds to the value of the light splitting angle, the controller 150 may set the value of the light splitting angle based on the suitable waveband range of the excitation beam EL required by the type of the fluorescent reagent included in the object under test O, thereby effectively forming the required fluorescent beam FL.

Besides, since the object under test O takes up a certain area, as the position at which the surface of the object under test O faces the sub-beams SL of the excitation beam EL differs, the waveband ranges of the sub-beams SL of the excitation beam EL that are received by the object under test O may also differ slightly. In this way, the width of the waveband range received by the object under test O may correspond to the width dimension of the surface of the object under test O facing the sub-beams SL of the excitation beam EL. More specifically, as shown in FIG. 3C, in the embodiment, the width dimension of the slit ST disposed on the at least one sleeve structure 121 may be designed according to the width of the first waveband range, thereby blocking stray beams within a undesired waveband range (i.e., outside the first waveband range). For example, when the width of the required first waveband range is about 30 nm, the width dimension of the slit ST may be set as about 1 mm. However, the disclosure is not limited thereto. The width dimension of the slit ST may be adjusted based on how wide/narrow the required first waveband range is, so as to adjust the the color purity of the sub-beams SL of the excitation beam EL. In addition, the width dimension of the slit SL may range between 0.5 mm and 1 mm.

In the following, relevant simulation data will be described in detail with reference to FIGS. 4A to 4D.

FIGS. 4A to 4D are simulated spectrum diagrams of the corresponding first waveband range when the movable light splitter 140 of FIG. 2 is rotated to different light splitting angles with respect to the excitation beam EL. Referring to FIGS. 4A to 4D, in the embodiments of FIGS. 4A to 4D, the optical parameters are all set as follows: the sum (i.e., the departure angle Dv) of the first included angle θ1 and the second included angle θ2 is set as 55.8 degrees, the grating constant d is set as 833.33 nm, the width dimension of the slit ST is set as 1 nm, and the values of the light splitting angle are respectively set as 9 degrees, 6 degrees, 4.5 degrees, and 2 degrees.

Figure 4A:
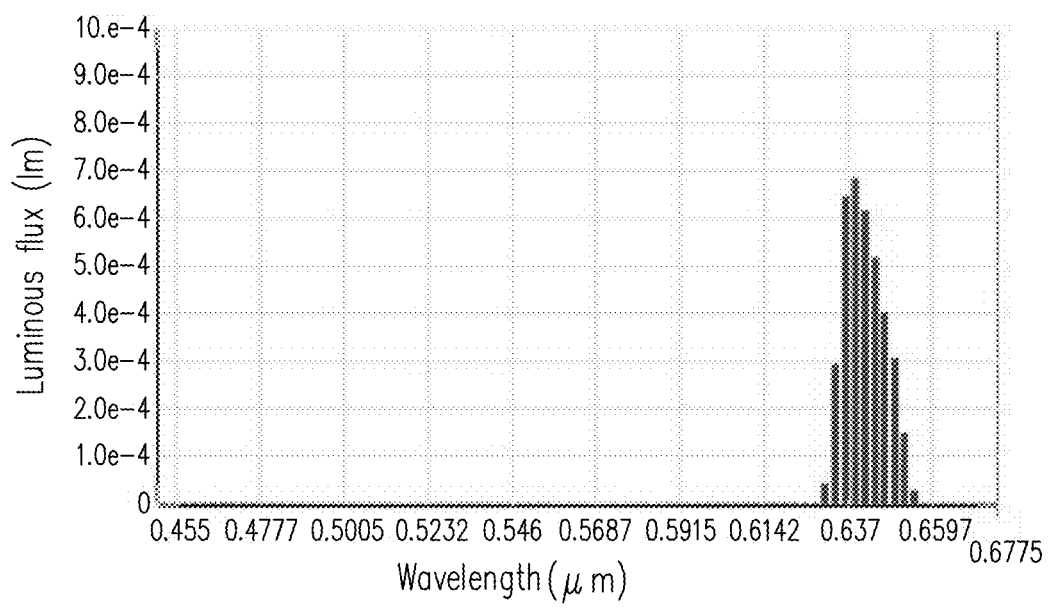
FIGS. 4A to 4D are simulated spectrum diagrams of the corresponding first waveband range when the movable light splitter of FIG. 2 is rotated to different light splitting angles with respect to the excitation beam.
Figure 4B:
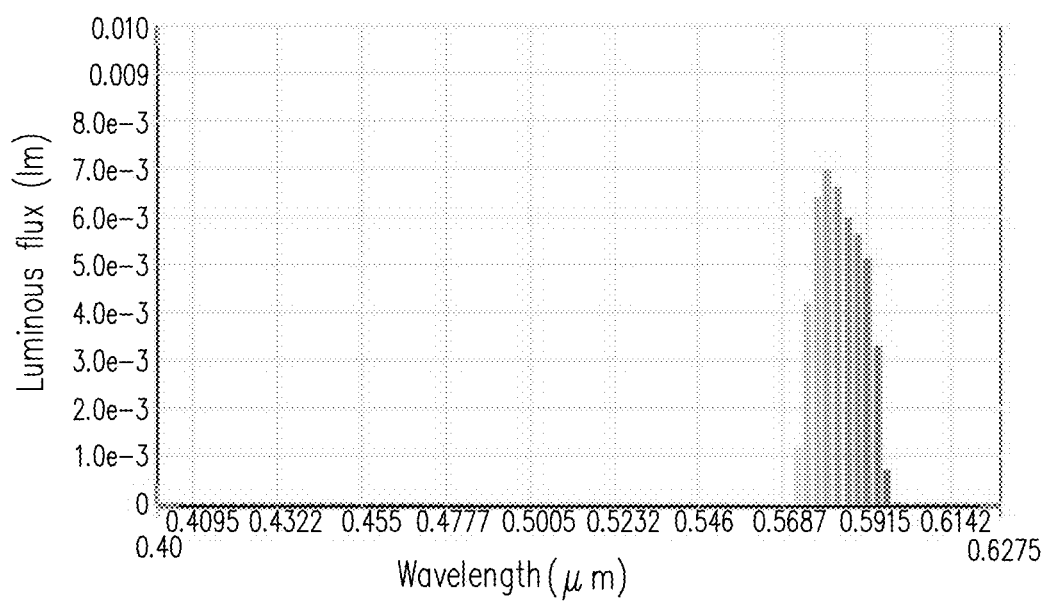
Figure 4C:
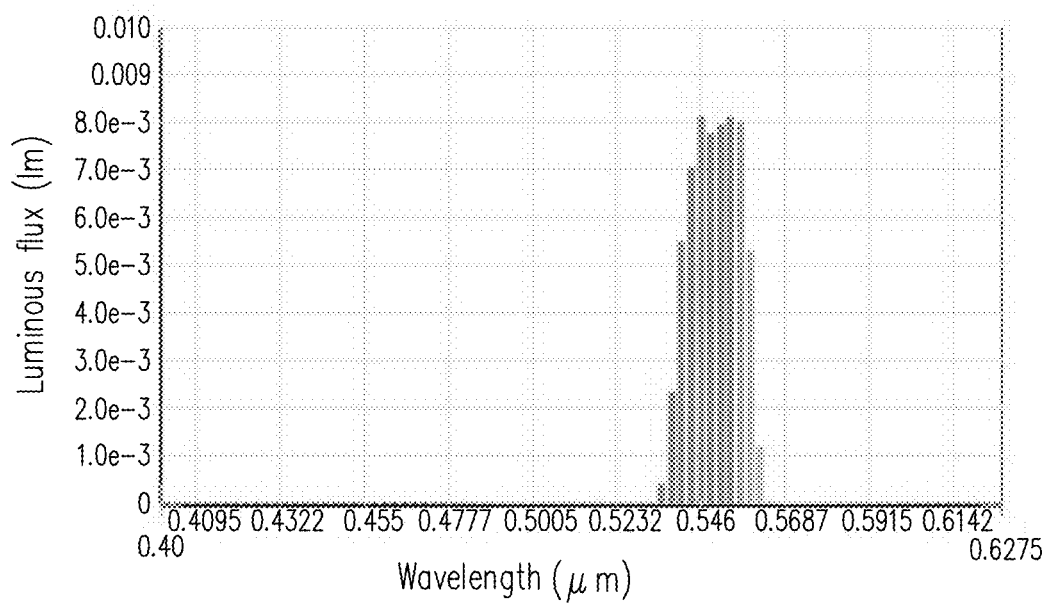
Figure 4D:
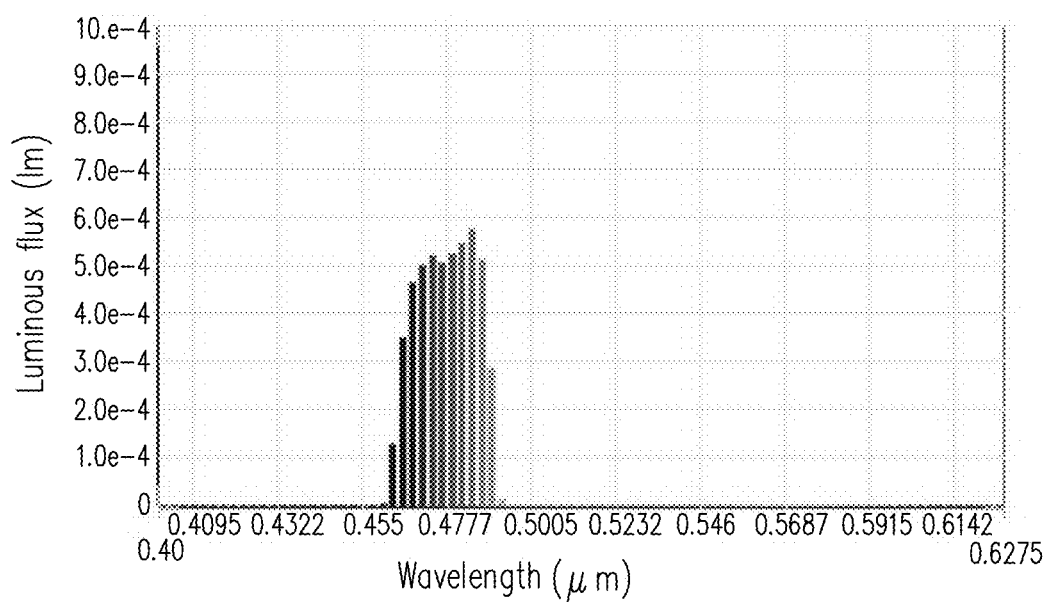

Thus, as shown in FIG. 4A, when the light splitting angle is 9 degrees, the dominant light emitting wavelength of the excitation beam EL that the object under test O can receive is 477 nm, and the width of the waveband range of the excitation beam EL is 30 nm. As shown in FIG. 4B, when the light splitting angle is 6 degrees, the dominant light emitting wavelength of the excitation beam EL that the object under test O can receive is 550 nm, and the width of the waveband range of the excitation beam EL is 30 nm. As shown in FIG. 4C, when the light splitting angle is 4.5 degrees, the dominant light emitting wavelength of the excitation beam EL that the object under test O can receive is 585 nm, and the width of the waveband range of the excitation beam EL is 30 nm. As shown in FIG. 4D, when the light splitting angle is 2 degrees, the dominant light emitting wavelength of the excitation beam EL that the object under test O can receive is 642 nm, and the width of the waveband range of the excitation beam EL is 30 nm.

In this way, the controller 150 may set the value of the light splitting angle based on the suitable waveband range of the excitation beam EL required by the type of the fluorescent reagent included in the object under test O, so as to form the required fluorescent beam FL, without having to configure a light filter module formed by band pass filters. In addition, the controller 150 only needs to adjust the light splitting angle of the first movable light splitter 141 to be compatible with detections using various types of different fluorescent reagents. Thus, it becomes easy to update and expand the equipment. Moreover, since the excitation beams EL required by different objects under test O may share the same light path when the detections using various types of different fluorescent reagents are being carried out, the light path can be simplified, and the production/assembling complexity can be reduced. Accordingly, the production cost can be reduced, and the production quality can be facilitated.

Similarly, as the types of fluorescent reagents differ, the ranges of the dominant light emitting spectra of the fluorescent beams FL formed by the objects under test O may also differ. Therefore, with the second movable light splitter 142 arranged between the accommodation frame 120 and the light detector 130, the detection device 100 may also perform Step S130 to control the operation of the second movable light splitter 142 according to the second waveband range, thereby filtering out the signals of stray light outside a specific waveband range and purifying the color purity of the fluorescent beam FL, so as to purify the properties of the fluorescent beam FL and facilitate the detection accuracy. In the following, details will be described with reference to FIGS. 5A to 5B.

Figure 5A:
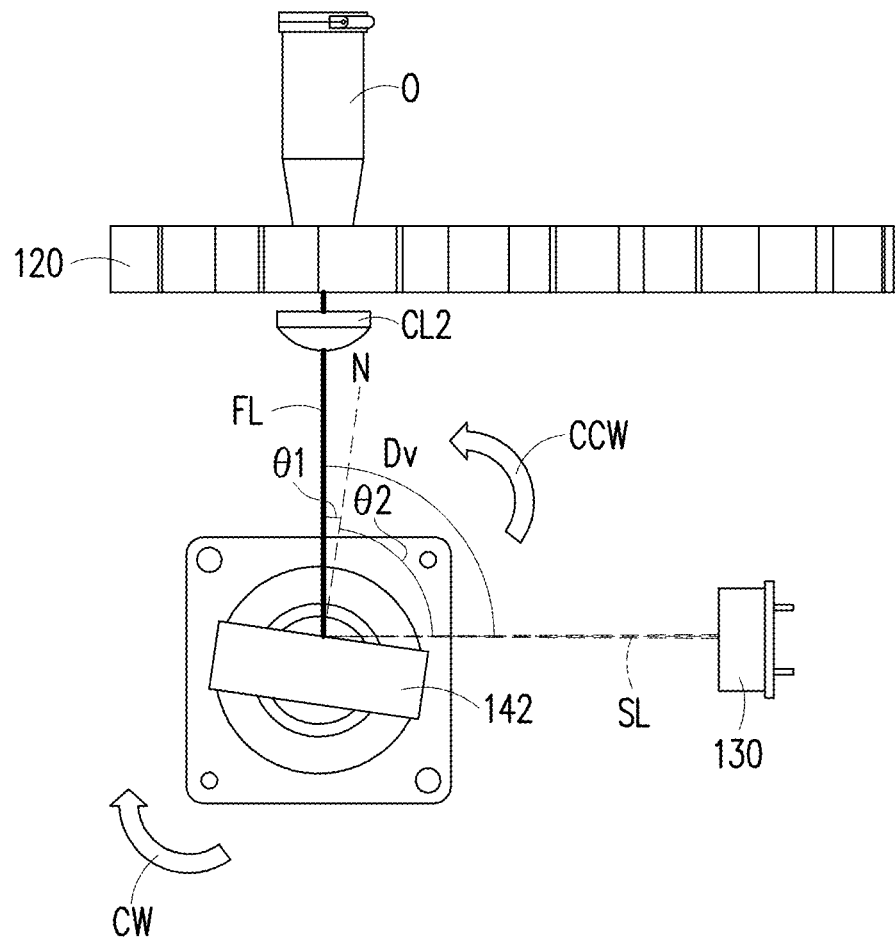
FIG. 5A is a schematic diagram illustrating a light path of the detection device of FIG. 2 when the incident beam is a fluorescent beam.
Figure 5B:
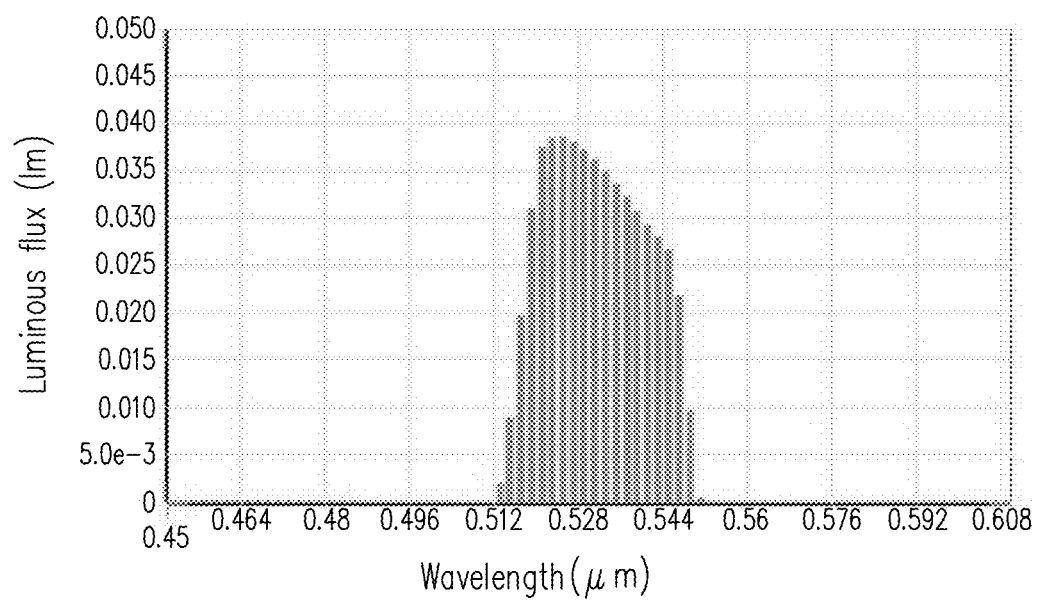
FIG. 5B is a simulated spectrum diagram of a corresponding second waveband range when the movable light splitter of FIG. 2 is rotated to a light splitting angle with respect to the fluorescent beam.

FIG. 5A is a schematic diagram illustrating a light path of the detection device of FIG. 2 when the incident beam is a fluorescent beam. FIG. 5B is a simulated spectrum diagram of a corresponding second waveband range when the movable light splitter of FIG. 2 is rotated to a light splitting angle with respect to the fluorescent beam. Referring to FIGS. 2 and 5A, after the fluorescent beam FL is formed, a collimating lens CL2 disposed between the accommodation frame 120 and the second movable light splitter 142 may collimate the fluorescent beam FL to form a parallel beam emitted onto the second movable light splitter 142 below. When the fluorescent beam FL, as the incident beam IL, is emitted onto the second movable light splitter 142, the second movable light splitter 142 may also form the sub-beams SL from the fluorescent beam FL. In addition, the controller 150 rotates the second movable light splitter 142 through driving by the actuator AR (e.g., motor) to rotate, so that when the first surface S1 is rotated to different light splitting angles with respect to the fluorescent beam FL, the light detector 130 may receive the fluorescent beam FL whose dominant light emitting wavelengths fall within different waveband ranges.

More specifically, as shown in FIG. 5A, when the fluorescent beam FL is incident to the second movable light splitter 142, the included angle θ1 (i.e., the incident angle of the fluorescent beam FL emitted by the object under test O with respect to the first surface S1) is present between the incident beam IL and the normal direction N of the first surface S1, and the second included angle θ2 (i.e., the emitting angle of the fluorescent beam FL received by the light detector 130) is present between a portion of the sub-beams SL whose dominant light emitting wavelengths fall within the second waveband range and the normal direction N of the first surface S1. In addition, since the location of the object under test O, the incident direction, and the position of the light detector 130 are all fixed, no matter how the second movable light splitter 142 is operated, the sum (i.e., the departure angle Dv) of the first included angle θ1 and the second included angle θ2 remains as a fixed value.

Therefore, in the embodiment, the light splitting angle may be set as the included angle between the incident beam IL and the normal direction N of the first surface S1, and the angle when the incident beam IL and the normal direction N of the first surface S1 overlap each other is set as 0 degrees. When the first surface S1 is rotated in the clockwise direction CW with respect to the incident beam IL, the value of the light splitting angle is positive, and when the first surface S1 is rotated in the counterclockwise direction CCW with respect to the incident beam IL, the value of the light splitting angle is negative. In addition, the light splitting angle ranges between 5.47 degrees and 27.73 degrees. In this way, since the value of the second waveband range corresponds to the value of the light splitting angle, the controller 150 may set the value of the light splitting angle based on the range of the dominant light emitting spectrum of the type of the fluorescent reagent included in the object under test O, thereby filtering out the signals of stray light outside the specific waveband range and purifying the properties of the fluorescent beam FL.

Meanwhile, as shown in FIG. 5A, since the sensing surface of the light detector 130 is configured to receive the portion of the sub-beams SL of the fluorescent beam FL whose dominant light emitting wavelengths fall within the second waveband range, and the distance between the light detector 130 and the second movable light splitter 142 as well as the width dimension of the sensing surface determine the width of the waveband range received by the sensing surface, in the embodiment, the width dimension of the sensing surface may be chosen according to the width of the second waveband range. For example, when the dimension of the sensing surface is 3.6 by 3.6 mm$^2$, and the minimum distance between the light detector 130 and the second movable light splitter 142 is 30 mm, the width of the second waveband range received by the sensing surface of the light detector 130 may be less than 30 mm. However, the disclosure is not limited thereto. The dimension of the sensing surface of the light detector 130 may serve to adjust the color purity of the sub-beams SL of the fluorescent beam FL based on the width of the required second waveband range, and may range between 1 mm$^2$ and 9 mm$^2$.

In the following, further descriptions will be made with reference to the simulated data of FIG. 5B. In the embodiment of FIG. 5B, the optical parameters are set as follows: when the sum (i.e., the departure angle Dv) of the first included angle θ1 and the second included angle θ2 is set as 90 degrees, the grating constant d is set as 833.33 nm, the dimension of the sensing surface is set as 3.6 by 3.6 mm$^2$, the minimum distance between the light detector 130 and the second movable light splitter 142 is 30 mm, and the value of the light splitting angle is set as 18.8 degrees, the fluorescent beam FL whose wavelength is between 512 nm and 546 nm can be attained on the sensing surface of the light detector.

Then, referring to FIG. 1B, the controller 150 may perform Step S150, at which the light intensity of the fluorescent beam FL whose dominant light emitting wavelength falls within the second waveband range is detected and converted into an electrical signal for further analysis.

In this way, the controller 150 may set the value of the light splitting angle based on the waveband range of the dominant light emitting spectrum of the type of the fluorescent reagent included in the object under test O, so as to filter out the signals of stray light outside the specific waveband range and purify the properties of the fluorescent beam FL, without having to configure a light filter module formed by band pass filters. In addition, the controller 150 only needs to adjust the light splitting angle of the second movable light splitter 142 to be compatible with detections using various types of different fluorescent reagents. Thus, it becomes easy to update and expand the equipment. Moreover, since the fluorescent beams FL formed by different objects under test O may share the same light path when the detections using various types of different fluorescent reagents are being carried out, the light path can be simplified, and the production/assembling complexity can be reduced. Accordingly, the production cost can be reduced, and the production quality can be facilitated.

It should be noted that, while in the above embodiment, the operations of the first movable light splitter 141 and the second movable light splitter 142 of the movable light splitter 140 are described as rotation, the disclosure is not limited thereto. In other embodiments, the movable light splitter 140 may also be operated to translate, and adjustments may be made thereto based on the optical requirements thereof. After referring to the disclosure, people of ordinary skills in the art shall be able to properly adjust the operation of the movable light splitter 140 so that the detection device still exhibits the effects and advantages described herein without departing from the scope of the disclosure. In the following, some embodiments will be described.

Figure 6A:
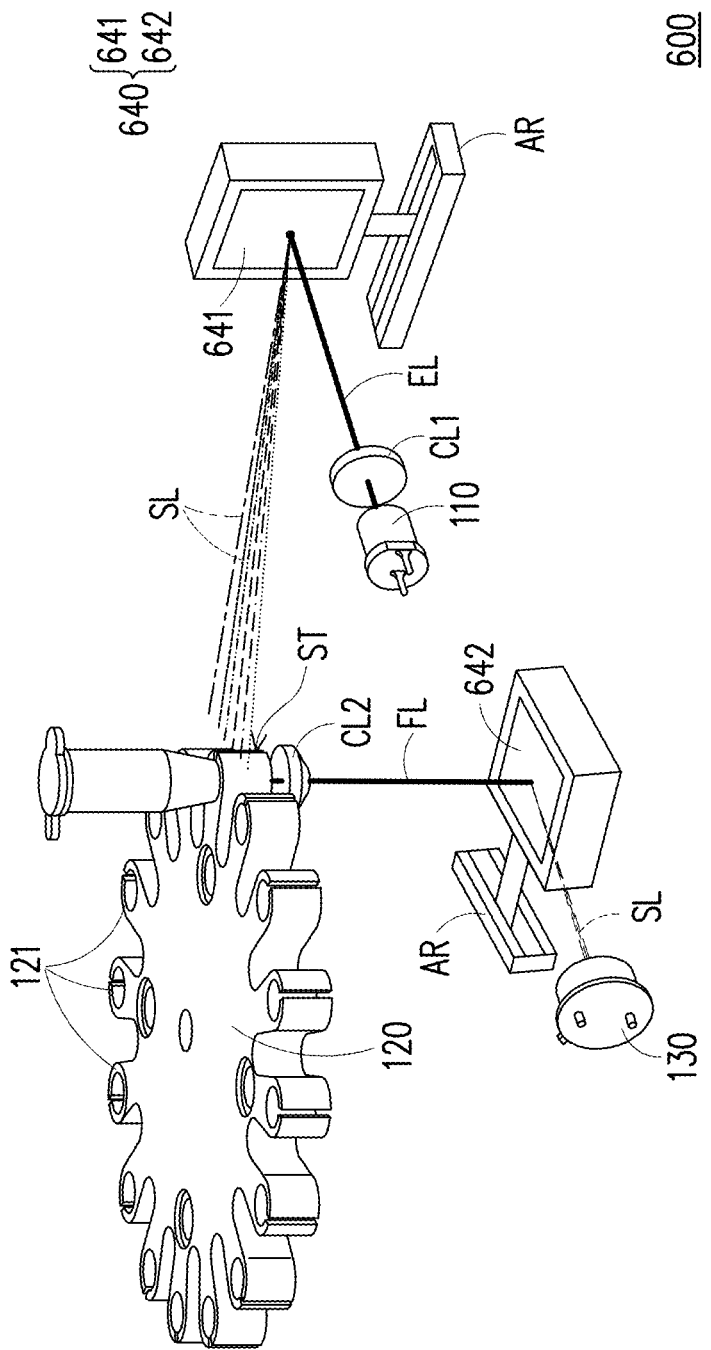
FIG. 6A is a schematic diagram illustrating another configuration of the detection device of FIG. 1A.
Figure 6B:
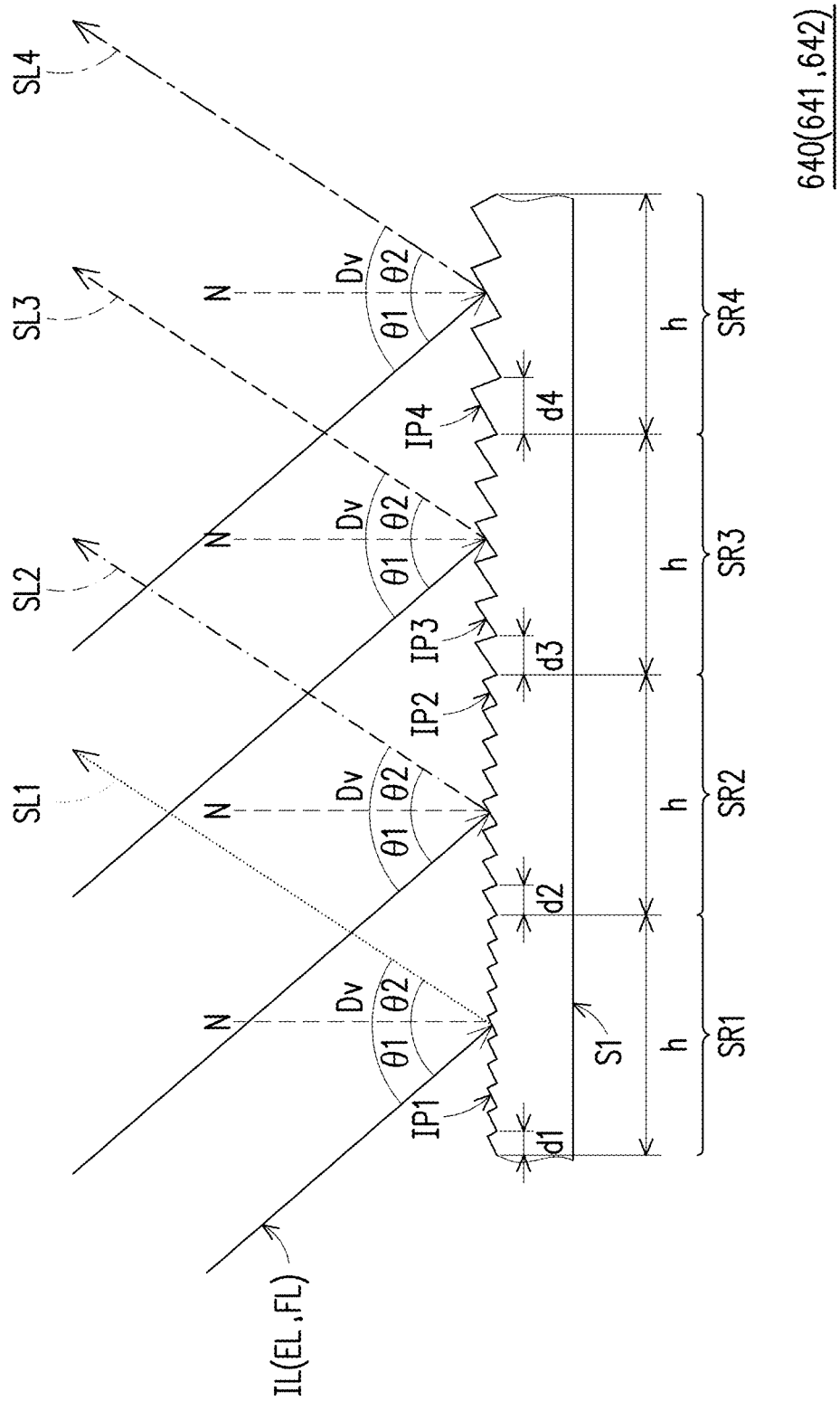
FIG. 6B is a schematic diagram illustrating a light path when the incident beam of FIG. 6A is incident to a movable light splitter.

FIG. 6A is a schematic diagram illustrating a configuration of another detection device according to an embodiment of the disclosure. FIG. 6B is a schematic diagram illustrating a light path when the incident beam of FIG. 6A is incident to a movable light splitter. Referring to FIGS. 6A to 6B, a detection device 600 is similar to the detection device 100 of FIG. 1, and the main difference therebetween is described as follows. As shown in FIG. 6A, in the embodiment, the actuators AR that drive a first movable light splitter 641 and a second movable light splitter 642 of a movable light splitter 640 are provided with guide rails. Accordingly, the movable light splitter 640 may move horizontally while allowing the movable light splitter 640 to keep the same incident angle with respect to the incident beam IL (i.e., having the same first included angle θ1).

In addition, as shown in FIG. 6B, each of the first movable light splitter 641 and the second movable light splitter 642 of the movable light splitter 640 may respectively be provided with a plurality of light splitting areas SR1, SR2, SR3, and SR4. Each of the light splitting areas SR1, SR2, SR3, and SR4 has the first surface S1 and a plurality of inclined surfaces IP1, IP2, IP3, and IP4. The inclined surfaces IP1, IP2, IP3, and IP4 are inclined with respect to the first surface S1. In addition, the intervals among the inclined surfaces IP1, IP2, IP3, and IP4 of the respective light splitting areas SR1, SR2, SR3, and SR4 define grating constants d1, d2, d3, and d4 of the respective light splitting areas SR1, SR2, SR3, and SR4. In addition, the grating constants d1, d2, d3, and d4 of the respective light splitting areas SR1, SR2, SR3, and SR4 are different from one another. Moreover, the first surfaces S1 of the first movable light splitter 641 and the second movable light splitter 642 of the movable light splitter 640 are able to move with respect to the incident beam IL, so that the light splitting areas SR1, SR2, SR3, and SR4 having the defined grating constants d1, d2, d3, and d4 may enter the transmission path of the incident beam IL.

More specifically, according to the above relation between the parameters such as the grating constants d1, d2, d3, and d4, the departure angle Dv, and the first included angle θ1, etc., and the waveband range of the diffraction beams (i.e., the sub-beams SL), when departure angles Dv and the incident angles when the incident beam IL is incident to the respective locations of the movable light splitter 640 are maintained at constant values, the grating constants d1, d2, d3, and d4 of the respective light splitting areas SR1, SR2, SR3, and SR4 can determine the waveband range of the diffraction beams (i.e., the sub-beams SL of the excitation beam EL or the sub-beams SL of the fluorescent beam FL).

Accordingly, the controller 150 may set the values of the grating constants d1, d2, d3, and d4 of the light splitting areas SR1, SR2, SR3, and SR4 entering the transmission path of the incident beam IL according to the suitable waveband range (i.e., the first waveband range) of the excitation beam EL required by the type of fluorescent reagent included in the object under test O or the range (i.e., the second waveband range) of the dominant light emitting spectrum of the fluorescent beam FL generated by the object under test O. In other words, when the incident beam IL is the excitation beam EL, the controller 150 may control the values of the grating constants d1, d2, d3, and d4 of the light splitting areas SR1, SR2, SR3, and SR4 of the first movable light splitter 641 entering the transmission path of the incident beam IL to correspond to the value of the first waveband range. When the incident beam IL is the fluorescent beam FL, the controller 150 may control the values of the grating constants d1, d2, d3, and d4 of the light splitting areas SR1, SR2, SR3, and SR4 of the second movable light splitter 642 entering the transmission path of the incident beam IL to correspond to the value of the second waveband range. Specifically, in the embodiment, the values of the grating constants of the respective light splitting areas range between 644 nm and 1380 nm.

As an example, in the embodiment, the optical parameters may be set as follows: the first included angle θ1 is set as 10 degrees, and in the case where the sum (i.e., the departure angle Dv) of the first included angle θ1 and the second included angle θ2 is 55.8 degrees, when the grating constant d1 is 878 nm, a sub-beam SL1 whose dominant light emitting wavelength is about 477 nm can be generated. Similarly, when the grating constant d2 is 1012 nm, a sub-beam SL2 whose dominant light emitting wavelength is about 550 nm can be generated, when the grating constant d3 is 1076 nm, a sub-beam SL3 whose dominant light emitting wavelength is about 585 nm can be generated, and when the grating constant d4 is 1181 nm, a sub-beam SL3 whose dominant light emitting wavelength is about 642 nm can be generated.

More specifically, as shown in FIG. 6B, a unit width h of the light splitting areas SR1, SR2, SR3, and SR4 of the first movable light splitter 641 and the second movable light splitter 642 of the movable light splitter 640 may be determined according to the illumination area of the incident beam IL (i.e., the excitation beam EL and/or the fluorescent beam FL). In the embodiment, the unit width is, for example, about 5 mm. However, the disclosure is not limited thereto. In other embodiments, the number of the light splitting areas of the movable light splitter 640 may also be determined according to the number of the types of fluorescent reagents, and the internal space limitation of the detection device 644 may be considered while the unit width h and the irradiation area of the incident beam IL (i.e., the excitation beam EL and/or the fluorescent beam FL) are adjusted to meet the product requirements.

In this way, the detection device 600 may control the value of the grating constant of the light splitting area entering the transmission path of the incident beam IL through the controller 150, so as to be compatible with various detections of different types of fluorescent reagents. Therefore, a light filter module formed by band pass filters is not required, and the updating and expansion of equipment become easy. As a result, similar effects and advantages similar to those of the detection device 100, which have been described above and will not be repeated, can be attained.

In view of the foregoing, by arranging the movable light splitter, the detection device according to the embodiment of the disclosure is compatible with the various detections of different types of fluorescent reagents, and does not require a light filter module formed by band pass filters. Therefore, it becomes easy to update and expand the equipment. Moreover, since the excitation beams required by different object under tests (or the fluorescent beams that are formed) may share the same light path when the detections of various types of different fluorescent reagents are being carried out, the light path can be simplified, and the production/assembling complexity can be reduced. Accordingly, the production cost can be reduced, and the production quality can be facilitated.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A detection device, comprising:
   a light emitting element, configured to provide an excitation beam;
   an accommodation frame, having at least one sleeve structure, wherein the at least one sleeve structure is configured to accommodate an object under test, and a portion of the excitation beam whose dominant light emitting wavelength falls within a first waveband range forms a fluorescent beam after passing through the object under test;
   a light detector, configured to receive a portion of the fluorescent beam whose dominant light emitting wavelength falls within a second waveband range; and
   a movable light splitter, comprising a first movable light splitter and a second movable light splitter, wherein each of the first movable light splitter and the second movable light splitter has a first surface and a plurality of inclined surfaces, the inclined surfaces are inclined with respect to the first surface, and the first surface is configured to be rotated a predetermined light splitting angle with respect to an incident beam, wherein the predetermined light splitting angle comprising a first predetermined light splitting angle and a second predetermined light splitting angle, the incident beam is at least one of the excitation beam and the fluorescent beam, when the incident beam is the excitation beam, a value of the first waveband range corresponds to a value of the first predetermined light splitting angle, and when the incident beam is the fluorescent beam, a value of the second waveband range corresponds to a value of the second predetermined light splitting angle, wherein the incident beam forms a plurality of sub-beams after passing through the inclined surfaces, the sub-beams have respectively different dominant light emitting wavelengths, and exit at different emitting angles, when the incident beam is the fluorescent beam, the second movable light splitter is located on a transmission path of the fluorescent beam and between the accommodation frame and the light detector, the light detector is located on transmission paths of the sub-beams, and a sensing surface of the light detector is configured to receive a portion of the sub-beams whose dominant light emitting wavelengths fall within the second waveband range, the second predetermined light splitting angle is an included angle between the incident beam and a normal direction of the first surface, an angle when the incident beam and the normal direction of the first surface overlap each other is set as 0 degrees, when the first surface is rotated in a clockwise direction with respect to the incident beam, a value of the second predetermined light splitting angle is positive, and when the first surface is rotated in a counterclockwise direction with respect to the incident beam, the value of the second predetermined light splitting angle is negative, and the second predetermined light splitting angle ranges between 5.47 degrees and 27.73 degrees.

2. The detection device as claimed in claim 1, wherein when the incident beam is the excitation beam, the first movable light splitter is located on a transmission path of the excitation beam and between the light emitting element and the accommodation frame, the at least one sleeve structure is located on transmission paths of the sub-beams, and each of the at least one sleeve structure has a slit configured to receive a portion of the sub-beams whose dominant light emitting wavelengths fall within the first waveband range.

3. The detection device as claimed in claim 2, wherein a first included angle is present between the incident beam and a normal direction of the first surface, and a second included angle is present between the portion of the sub-beams whose dominant light emitting wavelengths fall within the first waveband range and the normal direction of the first surface, and a sum of the first included angle and the second included angle is a fixed value.

4. The detection device as claimed in claim 2, wherein a width of the slit ranges between 0.5 mm and 1 mm.

5. The detection device as claimed in claim 2, wherein the first predetermined light splitting angle is an included angle between the incident beam and a normal direction of the first surface, an angle when the incident beam and the normal direction of the first surface overlap each other is set as 0 degrees, when the first surface is rotated in a clockwise direction with respect to the incident beam, a value of the first predetermined light splitting angle is positive, and when the first surface is rotated in a counterclockwise direction with respect to the incident beam, the value of the first predetermined light splitting angle is negative, and the first predetermined light splitting angle ranges between −2.7 degrees and 14.2 degrees.

6. The detection device as claimed in claim 1, wherein a first included angle is present between the incident beam and a normal direction of the first surface, and a second included angle is present between the portion of the sub-beams whose dominant light emitting wavelengths fall within the second waveband range and the normal direction of the first surface, and a sum of the first included angle and the second included angle is a fixed value.

7. A detection device, comprising:
a light emitting element, configured to provide an excitation beam;
an accommodation frame, having at least one sleeve structure, wherein the at least one sleeve structure is configured to accommodate an object under test, and a portion of the excitation beam whose dominant light emitting wavelength falls within a first waveband range forms a fluorescent beam after passing through the object under test;
a light detector, configured to receive a portion of the fluorescent beam whose dominant light emitting wavelength falls within a second waveband range; and
a movable light splitter, comprising a first movable light splitter and a second movable light splitter, wherein each of the first movable light splitter and the second movable light splitter has a plurality of light splitting areas, each of the light splitting areas has a first surface and a plurality of inclined surfaces, the inclined surfaces are inclined with respect to the first surface, intervals among the inclined surfaces of the respective light splitting areas define grating constants of the respective light splitting areas, the grating constants of the respective light splitting areas are different from one another, and the first surface is configured to move with respect to an incident beam, such that the light splitting areas having the grating constants enter a transmission path of the incident beam,
wherein the grating constants comprising a first grating constants corresponding to the first movable light splitter and a second grating constants corresponding to the second movable light splitter, the incident beam is at least one of the excitation beam and the fluorescent beam, when the incident beam is the excitation beam, a value of the first waveband range corresponds to values of the first grating constants, and when the incident beam is the fluorescent beam, a value of the second waveband range corresponds to values of the second grating constants,
wherein the value of the grating constant of each of the light splitting areas ranges between 644 nm and 1380 nm.

8. The detection device as claimed in claim 7, wherein a first included angle is present between the incident beam and a normal direction of the first surface, the incident beam is incident to each of the light splitting areas at the same first included angle, a plurality of sub-beams are formed after the incident beam passes through the inclined surface of one of the light splitting areas, and the sub-beams have respectively different dominant light emitting wavelengths and exit at different emitting angles.

9. The detection device as claimed in claim 8, wherein when the incident beam is the excitation beam, the first movable light splitter is located on a transmission path of the excitation beam and between the light emitting element and the accommodation frame, the at least one sleeve structure is located on transmission paths of the sub-beams, and each of the at least one sleeve structure has a slit configured to receive a portion of the sub-beams whose dominant light emitting wavelengths fall within the first waveband range.

10. The detection device as claimed in claim 9, wherein a width of the slit ranges between 0.5 mm and 1 mm.

11. The detection device as claimed in claim 9, wherein a second included angle is present between a portion of the sub-beams whose dominant light emitting wavelengths fall within the first waveband range and the normal direction of the first surface, and a sum of the first included angle and the second included angle is a fixed value.

12. The detection device as claimed in claim 8, wherein when the incident beam is the fluorescent beam, the second movable light splitter is located on a transmission path of the fluorescent beam and between the accommodation frame and the light detector, the light detector is located on transmission paths of the sub-beams, and a sensing surface of the light detector is configured to receive a portion of the sub-beams whose dominant light emitting wavelengths fall within the second waveband range.

13. The detection device as claimed in claim 12, wherein a second included angle is present between a portion of the sub-beams whose dominant light emitting wavelengths fall within the second waveband range and the normal direction of the first surface, and a sum of the first included angle and the second included angle is a fixed value.

\* \* \* \* \*